United States Patent [19]
Affolderbach et al.

[11] Patent Number: 5,171,617
[45] Date of Patent: Dec. 15, 1992

[54] COMPOSITE ENVELOPE COMPOSED OF A HEAT-SHRINKABLE FOIL WITH A REINFORCING LAYER AND THE METHOD OF MANUFACTURE

[75] Inventors: Ulrich Affolderbach, Wuppertal; Hans-Juergen Meltsch, Schwerte, both of Fed. Rep. of Germany

[73] Assignee: RXS Schrumpftechnik-Garnituren GmbH, Fed. Rep. of Germany

[21] Appl. No.: 719,349

[22] Filed: Jun. 24, 1991

[30] Foreign Application Priority Data

Aug. 20, 1990 [DE] Fed. Rep. of Germany ....... 4026317

[51] Int. Cl.$^5$ .................... B65B 53/00; F16B 4/00
[52] U.S. Cl. ...................... 428/34.9; 428/81; 428/913; 428/224; 428/222; 428/228; 428/231; 428/364; 428/371; 428/474.4; 428/411.1; 428/192; 428/35.2; 428/36.91; 428/35.9; 174/DIG. 8; 174/136; 285/381
[58] Field of Search .............. 428/68, 34.9, 81, 128, 428/132, 137, 247, 256, 913, 224, 222, 228, 231, 292, 346, 364, 371, 372, 374, 474.4, 411.1, 192, 35.2, 36.91; 285/381; 174/DIG. 8, 136

[56] References Cited

U.S. PATENT DOCUMENTS 4,816,326  3/1989  Jones et al. .................... 428/224
4,877,660  10/1989  Oberbergh et al. ............... 428/34.9
4,944,987  7/1990  Cordia et al. .................... 428/192

FOREIGN PATENT DOCUMENTS 0115905  8/1984  European Pat. Off. .

Primary Examiner—Ellis P. Robinson
Assistant Examiner—Charles R. Nold
Attorney, Agent, or Firm—Hill, Van Santen, Steadman & Simpson

[57] ABSTRACT

A composite envelope composed of a heat-shrinkable foil with a reinforcing layer containing tear-resistant fibers. The reinforcing layer is formed of a material which will melt below or at the temperature to which the heat-shrinkable foil is heated to stretch the foil and cause it to shrink back to its original condition so that the tear-resistant fibers are free to move in the melted material. Preferably, the composite is formed by providing carrier elements either having the fibers wrapped thereon or contained therein and assembling them with the shrinkable foil, heating to a stretching temperature to cause a melting of the carrier elements and stretching the foil at that temperature to create the memory and then holding the stretching forces until the foil has cooled to solidify the material of the carrier elements to form the reinforcing layer.

32 Claims, 3 Drawing Sheets

FIG 1
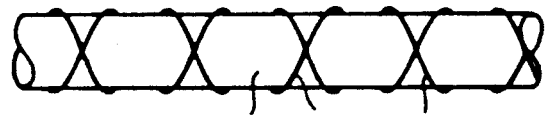
FIG 2
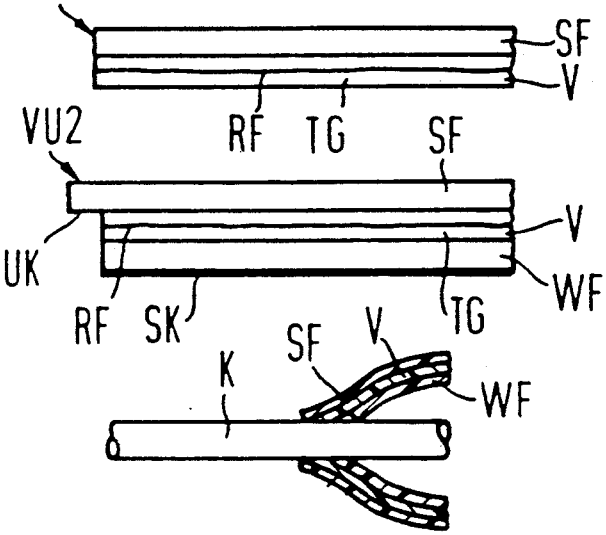
FIG 3
FIG 4
FIG 5
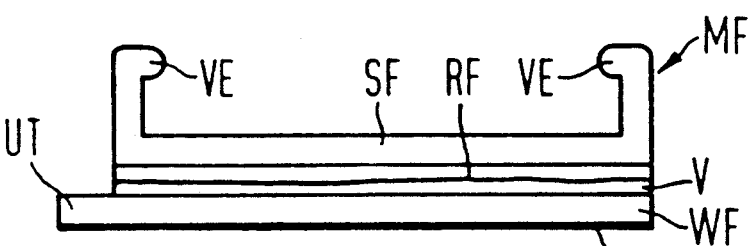
FIG 6
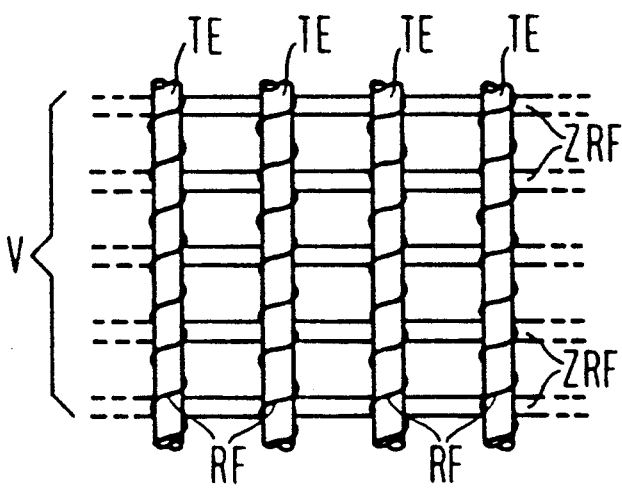
FIG 8

COMPOSITE ENVELOPE COMPOSED OF A HEAT-SHRINKABLE FOIL WITH A REINFORCING LAYER AND THE METHOD OF MANUFACTURE

BACKGROUND OF THE INVENTION

The present invention is directed to a composite envelope composed of at least one heat-shrinkable foil and using reinforcements composed of tear-resistant fibers.

European Application 0 115 905 discloses a heat-readjustable or shrinkable object which is composed of shrinkable fabrics having shrinkable threads or fibers composed of cross-linked polymers, which are stretched and, thus, heat-readjustable or shrinkable. In addition, high-strength threads composed of polyester or glass can be woven into this fabric. However, a disadvantage of this device is that the tensile strength of the heat-shrinkable threads or fibers are extremely low exactly at the shrinking temperature. In addition, the risk exists that along the threads of the fibers, cavities can develop into which moisture will penetrate.

SUMMARY OF THE INVENTION

The present invention is now based on the object of creating a heat-shrinkable composite envelope, wherein the embedding of the corresponding reinforcements increases the mechanical stability compared to conventional structures. The embedded reinforcements are also protected from moisture penetration along their surfaces. According to this invention, the objects are achieved with an improvement in a composite envelope utilizing at least one heat-shrinkable foil and having reinforcements composed of tear-resistant fibers. These tear-resistant fibers extend approximately in the shrink direction and are arranged on or in carrying elements which are allocated to the foil and in that the carrier element is composed of a material that will melt at a temperature below or at least at the temperature used for stretching and shrinking the shrinkable foil so that during stretching and shrinking, the carrier element is melted in an amorphous fashion to form together with the tear-resistant fiber a reinforcement layer.

A particular advantage of the invention is that the tear-resistant fibers can be integrated in a shrink direction and a corresponding configuration that permits an extension during the stretching operation.

Thus, it is possible in a simple manner to introduce an excess length of the tear-resistant fibers in the composite envelope. This composite envelope is composed of at least one heat-shrinkable foil, on which several tear-resistant fibers extend approximately in the shrink direction and wherein they can be firmly anchored along the edges, which are preferably fashioned as sealing elements. In order to achieve an excess length, the tear-resistant fibers are arranged in coiled fashion or a meandering fashion so that they do not extend in a straight line.

It is particularly advantageous to coil the tear-resistant fibers on individual thread-shaped carrier elements so that the fibers have an excess length compared to the length of the individual carrier element. According to the invention, the carrier element is composed of a plastic material which has a melting temperature in a range of between 60° C. and 160° C. and will melt at a stretching or shrinking temperature of the foil, which is in a range of approximately 120° C. and 160° C. for a polyethylene material. Preferably, the carrier material is not a cross-linkable material, and, for example, it is a polyamide or other low-viscosity material, when warmed up to the stretching temperature. An increase of the viscosity due to the cross-linking event of the heat-shrinkable foil is a possible advantage for the mechanical properties. A corresponding warm-up to the specific stretching/shrinking temperature causes the carrier elements to melt into an amorphous fashion and fill all possible cavities along the embedded tear-resistant threads in a sealing fashion and remain there. Thus, the tear-resistant fibers are embedded in this condition, so to speak in a floating fashion, so that an almost unobstructed stretching of the composite envelope can occur. When the composite envelope is stretched, the tear-resistant fibers embedded with an excess length, for example not straight but helical and in a floating fashion, are then pulled out, possibly to their full length. Thus, the coil slope or pitch is correspondingly adapted to the stretching degree of the composite envelope. In the shrinking event, which is in a reversed fashion, again an almost unobstructed movement of the tear-resistant fiber is possible due to a repeated melting of the already-melted carrier substance, and, due to the virtually liquid carrier material, a buckling of the tear-resistant fiber will occur with the restitution of the excess length. The repeated melting of the carrier material provides that after the shrinking, the tear-resistant fibers are again enveloped in a particular sealed fashion so that the moisture can no longer penetrate. In the cooled-off condition, it is further guaranteed after the shrinking that the tear-resistant fibers are embedded in the composite, which is composed of the shrunk foil and the carrier material in an unmovable fashion.

The tear-resistant fibers are advantageously composed of a high-temperature resistant material, preferably selected from a group consisting of glass, ceramic, aramides, carbon or combinations thereof.

The carrier elements for the non-tear fibers are expediently composed of a non-cross-linkable plastic material, preferably of a polyamide or of other materials that are of a particularly low viscosity at the stretch/shrink temperature of the foil, so that the melting point of these materials must, respectively, lie below or at the most be at the stretch and/or shrink temperature. For example, if the shrinkable foil is of a polyethylene which has a temperature for both shrinking and stretching in a range of 130° C. to 160° C., then the carrier material should have a range of about 60° C. to 160° C. for its melting point. With the stretch and shrink temperature, the viscosity of the carrier material should be selected so that the material is of the lowest possible viscosity, advantageously at least sluggish. Appropriate are values of around $10^6$ m Pas.

The volume portion of the meltable carrier member is expediently selected to be larger than the volume portion of the tear-resistant fibers. This excess of meltable material insures a good embedding of the fibers and a good seal of the fibers.

To be safe, the temperature of the melting point of the carrier member should lie several degrees below the stretch or shrink temperature and, preferably, at least 10° C. below.

On such a carrier element, which can basically have a circular cross section, several tear-resistant fibers can be attached, proceeding either in parallel fashion or also crossing each other. It is also possible to embed the tear-resistant fibers into a carrier material which is of a low viscosity during the stretching and/or shrinking. It is also conceivable that a combined structure formation, for example a type of fabric stocking or similar formation, could be used.

The tear-resistant fibers can possibly be additionally at least partially stretchable so that a stretching rate generated during the stretching even can take advantage of this partial stretching during the shrinking, as well.

Apart from these tear-resistant fibers basically proceeding in the shrink direction, other tear-resistant additional fibers can be embedded, namely, basically, perpendicular to the shrink direction. Thus, these additional fibers can be directly embedded without additional lengths. Thus, it is also possible to generate a fabric or grid-type structure composed of tear-resistant fibers. The individual carrier elements only need to be arranged in the shrink direction. For the manufacture of a composite envelope for a cable sleeve, it may be advantageous when such reinforcement fibers are arranged on or in a carrier for or between two carrier foils so that they can be connected as joint elements with the shrinkable foil. The connection of these tear-resistant elements with the shrinkable foil is either performed by a coextrusion or by lamination. Furthermore, the reinforcement layer of the elements can also be arranged between two shrinkable foils, which has a particular additional advantage that the two foils are additionally connected with one another at least in a pointwise fashion by mutual transgrid action of the materials through the reinforcement layer.

Along the longitudinal edges, preferably, longitudinal seals are applied, with whose assistance the closing occurs after the object has been enveloped, for example a cable. Thus, it is useful if the outer shrinkable foil projects over a lateral edge so that after the shrinking, this foil rests on the object being encased in the envelope so that, at the same time, an additional seal to the introduced object can occur by melting of the carrier element. In general, the inside of this composite envelope is also provided with a layer of hot sealable glue.

The tear-resistant fibers residing in the shrink direction of the melted carrier elements are fastened in the area of their outer ends. For example, the seal elements are assisted in the longitudinally proceeding insert so that they cannot wander off during the stretching or shrinking event.

The invention is furthermore related to the method of manufacturing the composite envelope, which is characterized in that the composite envelope at least composed of the later shrinkable foil and the tear-resistant fibers arranged on or in the carrier elements are warmed up to the temperature required for the stretching event and then, while in this condition, the stretching of the shrinkable foil and the tear-resistant fibers occurs and the carrier elements melt and the composite envelope is subsequently kept in this stretched condition until a cooling off of the composite to solidify the material of the elements and to form the memory of the article.

Another possibility for the manufacture is that the composite envelope that has already been generated by laminating the cross-linked foil with the reinforcement layer is brought to the stretching temperature, wherein this temperature is kept until the melting of the carrier elements, that then the stretching occurs, whereby the composite envelope is kept in the stretched condition until the cooling-off to a fastening temperature to form the memory.

The manufacturing can also occur such that the reinforcement layer composed of the carrier elements and the tear-resistant fibers are applied to the shrinkable foil after the stretch event, preferably by lamination, and that the shrink temperature is selected so that the carrier elements can be melted in an amorphous fashion in this composite shape.

When the reinforcement is applied during the stretch event for the manufacturing of the shrink memory for the shrinkable foil, the temperature at which this is to occur is to be selected so that the carrier elements melt and that the tear-resistant fibers can be stretched in a freely movable fashion. Subsequently, the cool-off occurs in the stretched condition down to the fastening temperature of the form memory.

Another possibility is that the reinforcement is already applied by coextrusion. Then, one has to proceed in the same way.

The combining of the individual composite layers can also occur only after the cross-linking of the latter shrinkable foil has taken place, so that the same conditions as to the melting of the carrier element then apply for the stretching, since the free movability of the tear-resistant fibers must be given here already.

If, however, the combining of the individual elements is performed only after the cross-linking and stretching of the now shrinkable foil, the shrink temperature must be selected so that the complete melting of the carrier elements can occur during the shrink event in order to be able to guarantee a free movability of the tear-resistant fibers without impeding the shrinking event.

Other advantages and features of the invention will be readily apparent from the following description of the preferred embodiments, the drawings and claims.

BRIEF DESCRIPTION OF THE DRAWINGS

FIG. 1 is a side view of a carrier element with a wrapping of a tear-resistant fiber in accordance with the present invention;

FIG. 2 is a side view of a carrier element with two applied tear-resistant fibers;

FIG. 3 is a side view of an edge of a composite foil composed of a shrinkable foil and reinforcing layer in accordance with the present invention;

FIG. 4 is a side view of an edge of a composite foil having a first shrinkable foil, a reinforcing layer and a second shrinkable foil;

FIG. 5 is a cross sectional view with portions in elevation showing a composite foil being enveloped on a cable;

FIG. 6 is an end view of a cable sleeve structure in accordance with the present invention;

FIG. 8 is a plan view of an arrangement of additional fiber elements in a mat having shrinking in only one direction;

DESCRIPTION OF THE PREFERRED EMBODIMENTS

Figure 7:
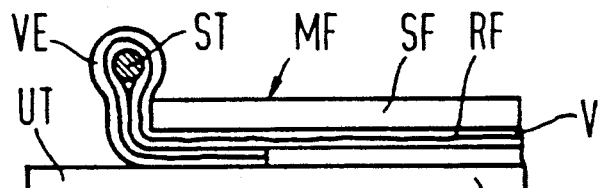
FIG. 7 is a partial end view of an improved structure of a cable sleeve in accordance with the present invention.

The principles of the present invention are particularly useful when incorporated in a composite envelope, generally indicated at VU1 in FIG. 3. The envelope VU1 is composed of a cross-linkable foil SF, which is covered on one surface with a reinforcing layer V, which is formed by a carrier layer TG containing a large number of reinforcing elements or fibers RF that extend in a parallel fashion but with excess length.

In order to obtain the reinforcing layer V, individual elements composed of thread-shaped carriers TE (FIG. 1), which have a tear-resistant element or fiber RF coiled or wrapped thereon, are used. As described earlier, the helical pitch of the fiber RF is adapted to the corresponding stretching rate. When the melting temperature of the carrier element TE is reached, it will melt to a shapeless, amorphous mass in which the tear-resistant fiber RF can be drawn out in an unobstructed fashion. This event occurs during the stretching of the composite envelope VU1 of FIG. 3.

A carrier element TE, as illustrated in FIG. 2, which is going to be used for forming the reinforcing layer V can also have several tear-resistant fibers RF1 and RF2, which are coiled thereon. As illustrated in FIG. 2, these tear-resistant fibers RF1 and RF2 are coiled in opposite directions and, thus, will cross each other.

To form the envelope VU1 of FIG. 3, reinforcing elements, including carrier elements TE, are applied on a foil SF and this unit is subsequently heated and thereby stretched. This results in the melting of each of the carrier elements TE, which are then laying on the foil and proceeding in a parallel fashion to one another. The melting temperature of the carrier element TE lies below or at the most at the stretched temperature of the cross-linked foil SF. The carrier elements TE, thereby, will fuse to form the closed carrier layer TG in which the tear-resistant fibers RF are embedded, namely approximately in a stretched condition.

Within the reinforcing layer, the volume portion of the meltable carrier elements TE is expediently selected to be correspondingly larger than the volume portion of the tear-resistant fibers RF. Advantageously, the volume portion of the carrier element is to be selected so that a "floating", all-side embedding of the tear-resistant fibers RF in the stretched condition will occur; for example, they are surrounded on all sides by the melted material of the layer TF of the prior carrier elements TE. Advantageously, the volume portion of the material of the carrier element or of the layer TG is to be at least 2 to 100 fold greater than the volume of the tear-resistant fibers RF. Appropriately, a value of in a range of between 4 and 20 times is desirable. The material TG of the melted carriers TE, according to FIGS. 1 and 2, constitutes a through-layer or continuous layer in FIG. 3.

Suitable materials for the carrier elements TE are particularly amides, preferably polyamides. Also, thermoplastic polyesters, ethylene-propylene-dieneselastomers (EPDM) can be used. Since a particularly good adhesion of the reinforcing layer V on the shrinking foil is desired, a particular advantage is the use of a so-called hot-sealable glue for the carrier elements TE, because this will guarantee the good adhesion. Furthermore, a good wetting or covering of the tear-resistant fibers RF will occur so that no cavities are formed and, thus, a sufficient longitudinal water seal or pressure tightness is guaranteed.

A modification of an already stretched composite envelope is generally indicated at VU2 in FIG. 4 and is composed of an outer shrinkable foil SF, a reinforcing layer V residing therebelow and another foil WF composed of a thermoplastic material. The reinforcing fibers RF exist in a stretched condition and basically proceed in a straight fashion. The other foil WF can, likewise, preferably be composed of a shrinkable material. In this way, an increase in the shrink force can be achieved by the cooperation of the outer shrinking foil SF and the inner shrinking foil WF. The layers SF and WF can be composed of differently cross-linkable plastic materials. Moreover, this arrangement has the advantage that the melted material of the prior carrier elements TE forming the layer TG cannot drip toward the inside, but is kept together on both sides in a sealed layer, which is superimposed between the two shrinkable layers.

On the inside, which is the bottom surface of the foil WF, a layer of hot-sealable glue SK can be applied. This will effect an adhesion on the basis when the composite envelope is applied, for example on a basic cable or pipe. It is also desirable when the outer shrinkable foil SF is designed so it provides a lateral overhanged edge UK along each side of the foil.

As illustrated in FIG. 5, the overprojecting or overhanging edge UK of the outer shrinkable foil SF after shrinking the composite envelope VU2 of FIG. 4 on a cable K. This reveals that, after the shrinking, the outer foil SF rests tightly on the cable K like a cuff. At the shrinking temperature, the reinforcement layer V likewise becomes liquid again and, thus, completely seals the intermediate space between the foils SF and WF. Due to the shrinkage force, the melted material of layer TG of the reinforcement layer V is, thus, pressed on the outside wall of the cable K and with that, a particularly safe seal is achieved. The shrink-on sleeve can envelope a cable splice (not shown in detail).

It is also possible, however to seal the respective composite envelope VU2 at its edges. This means closely combining the layers SF and WF with one another so that the leakage of the melted material of the carrier elements TE is prevented.

In the embodiment illustrated in FIG. 6, a composite envelope can be fashioned as a sleeve or bushing MF, particularly as a cable sleeve. This sleeve is composed of an outside shrinking foil SF, as well, a reinforcing layer V and another foil WF. The cable sleeve of FIG. 6 also is coated on a bottom surface with a hot-sealable glue SK, which is applied on the layer WF. As illustrated, the layer WF has an overhang UT along one edge so that when it is rolled up, the gap between laterally stressed sealing elements VE will be covered. The sealing elements VE are pressed together in a known matter by, for example, longitudinally extending closing of clamping rails. The applied sealing elements VE are nondeformable at the shrink temperature so that it is possible to achieve a safe seal, possibly with the assistance of a sealing longitudinal insert.

A shrink sleeve of particular high tensile strength can be created, as illustrated in FIG. 7. Herein, the reinforcement layer V is wound in a loop-shaped fashion to form respective sealing elements VE on both sides, so that no "pulling through" of the tear-resistant threads RF can occur during the stretching of the composite envelope. Thus, it is useful to provide yet another reinforcing rod or shaft ST in the area of the sealing element VE, which rod extends in a longitudinal direction and around which the reinforcing layer V and, thus, also the tear-resistant fibers RF are wound and guided back again into the area of the foils SF and WF.

As illustrated in FIG. 8, the carrier elements TE, with the tear-resistant threads RF wound thereon either as a single winding of FIG. 1 or a double-winding as in FIG. 2, are provided in a mat with the elements TE extending substantially parallel to each other. Additional carrier elements ZRF are also provided and these extend transverse relative to the shrink direction and, thus, the direction of the elements TE to form a mat. In the example illustrated in FIG. 8, it is assumed that the shrinkage is to occur only in the direction of the carrier elements TE and not transverse thereto. However, the additional fibers ZRF can form the beginning process, basically in a straight fashion, since during the stretching event, only an extension in the direction of the longitudinal axis of the carrier elements TE will occur, however, in the direction of the longitudinal axis of additional fibers ZRF there is no extension.

Figure 9:
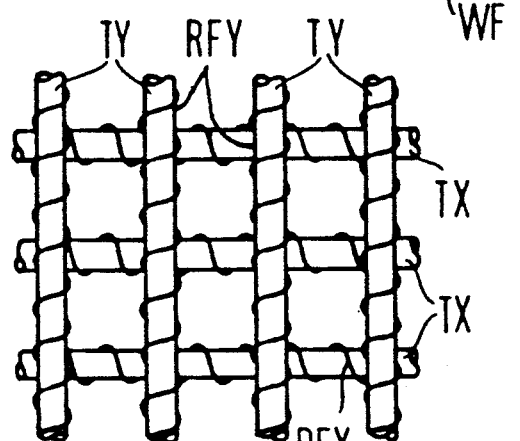
FIG. 9 is a plan view of an arrangement of fiber elements is a mat having two shrinking directions.

In FIG. 9, the mat is composed of carrier elements TY, which extend parallel to one another in one direction, and additional elements TX, which extend parallel in another direction transverse to the direction of the elements TY. Each of these elements TX is provided with reinforcing fibers RFX, while the elements TY are provided with reinforcing fibers RFY. This structure provides a reinforcing layer which offers the possibility of performing a stretching and, thus, a shrinking in two directions perpendicular to one another, namely along the axes of both the elements TY and TX. In both cases, during the stretching event, the coiled, tear-resistant threads, such as RFY, are drawn basically into a stretched shape in the direction of the carrier elements TY, and the tear-resistant threads RFX are drawn in the direction of the carrier elements TX.

In both the embodiments of FIGS. 8 and 9, the reinforcing threads or fibers were wrapped on the outer surfaces of the elements. In the one embodiment illustrated in FIG. 10, the carrier elements TY1 are provided in one direction and the elements TX1 are provided in the other direction. The elements TY1 have reinforcing fibers RY1 which are embedded therein, while the elements TX1 surround elements RX1. Thus, the mat formed by these elements can shrink in two directions. This means that the fibers which also proceed in the helical fashion in each of these elements are embedded inside of the material of the elements, such as TY1 and TX1, to provide the excess length to allow stretching.

Figure 10:
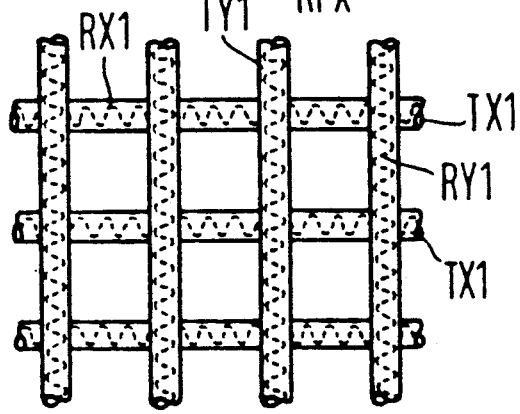
FIG. 10 is a plan view of a variation of a structure of the mat of FIG. 9.
Figure 11:
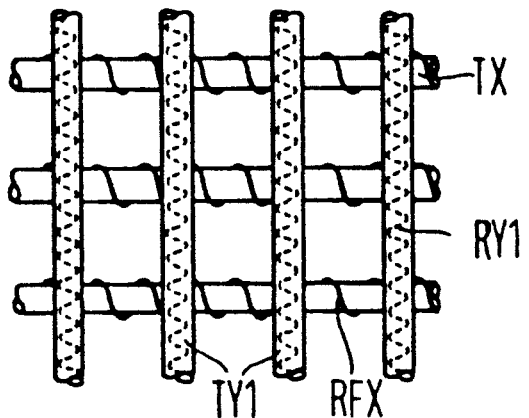
FIG. 11 is a mixed structure of a mat.

A composite layer is illustrated in FIG. 11 and is composed of mixed carrier elements, wherein the carrier elements TX with fibers RFX have a structure according to that illustrated in FIG. 9, while the carrier elements TY1 with the fibers RY1 have the structure according to FIG. 10.

Figure 12:
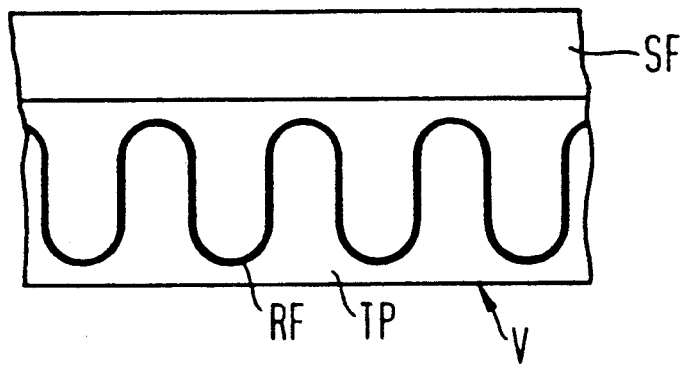
FIG. 12 is an edge view of a composite foil in accordance with the present invention.

The carrier element illustrated in FIG. 12 was already constructed or fashioned before the stretching event in the form of a plate or foil TP, which extends itself over a larger length and which is connected with the foil ZF and possibly WF in a manner similar to that illustrated in FIGS. 3 and 4. This makes is simpler, particularly in that the material of the carrier member or layer TP is composed of an easily meltable substance, whereby particularly the employment of a hot-sealable glue is useful. Within the carrier member TP, the tear-resistant threads RF proceed in a form resulting in excess length. In the present example, the form is a meandering or serpentine line. It is also possible, however, that the various tear-resistant threads proceed in the form of coils, i.e., analogously approximately to the exemplary embodiment illustrated in FIG. 1.

Figure 13:
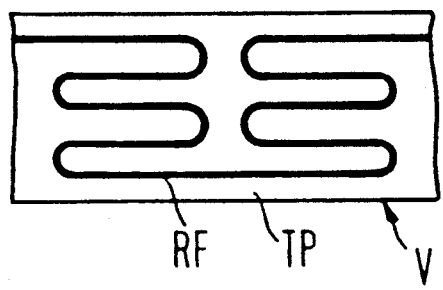
FIG. 13 is an edge view of an embodiment of a carrier element of the present invention.

In FIG. 13, an embodiment uses a plate or foil-shaped carrier element or carrier layer TP. Here, the tear-resistant threads RF are formed within the thickness of the carrier plate TP in several layers above one another and proceed in a loop-shaped fashion so that correspondingly many structures analogous to FIG. 13 are to be imagined within the carrier plate TP in series next to each other on the right and left. During the stretching process, the tear-resistant fibers RF stretch according to FIGS. 12 and 13 in about a straight position, which is easily possible due to the virtually liquid condition of the material of the carrier member TP. Another thing that occurs during the shrinking is, again, a thickening of the then likewise melted carrier TP so that, again, space develops for an approximately coiled or otherwise wound or looped courses for the tear-resistant threads RF. This means a restitution from the stretched condition into a wavy, helical or other structure occurs which, again, accepts the excess length.

In each of the above-described embodiments, the fibers, such as RF, are applied with excess length to enable the stretching. In the embodiment illustrated in FIG. 14, the carrier member TP is a foil or plate-shaped unstretched member in which individual tear-resistant thread pieces RFS are embedded. These tear-resistant thread pieces do not reach across the full length of the composite element but only across a partial area so that in general no coiled, waved or other structure resulting in excess length is necessary. During the stretching process, the tear-resistant threads RF slide by one another and increase their distance, whereas during the shrinking, they again slide by each other to contract. It must merely be observed that sufficiently many tear-resistant thread pieces RFS come to lie on top of one another so that in all a layer of fiber pieces remains that is still closed also in the stretched condition and that no throughgoing disconnected points develop. The longitudinal axis of the fiber pieces RFS proceed basically in the stretching or shrinking direction.

Figure 14:
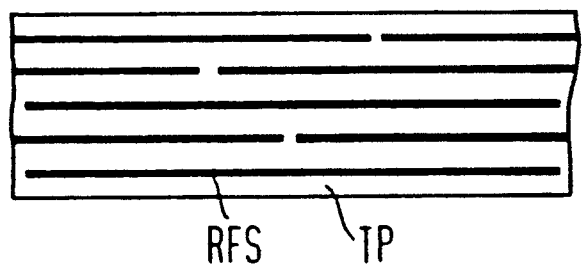
FIG. 14 is an edge view illustrating yet another embodiment of a carrier element of the present invention.

In the embodiments according to FIGS. 12–14, the volume portion of the carrier member TP was respectively larger than those of the tear-resistant threads RF or RFS.

Figure 15:
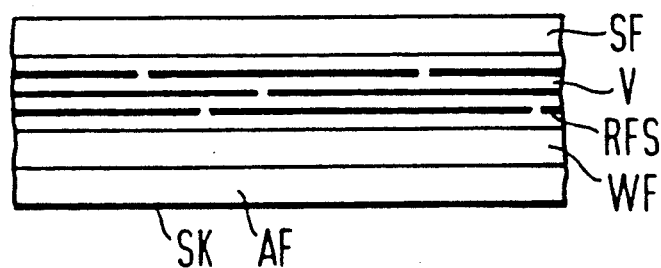
FIG. 15 is an edge view of a composite foil having a carrier body, such as illustrated in FIG. 14, with shrinkable layers.

A composite member, which uses a reinforcing layer V formed of the carrier layer TP of FIG. 14, is illustrated in FIG. 15. Here, the shrinking foil SF, the reinforcing layer V with the embedded tear-resistant pieces RFS and an additional foil WF, which is also a shrinkable material, are formed in a sandwiched condition. In addition, a metal foil AF, which is preferably aluminum foil, is subsequently applied on the second foil WF as a water vapor barrier. The aluminum foil AF is coated on an exposed surface with a layer of hot-sealable glue SK.

Although various minor modifications may be suggested by those versed in the art, it should be understood that we wish to embody within the scope of the patent granted hereon all such modifications as reasonably and properly come within the scope of our contribution to the art.

We claim:

1. In an envelope composed of a heat-shrinkable foil and having reinforcements composed of tear-resistant fibers, the improvement comprising several tear-resistant fibers being applied individually on thread-shaped carrier elements, said carrier elements with the tear-resistant fibers being provided to extend approximately in the shrink direction on the heat-shrinkable foil, said carrier elements being composed of a carrier material having a melting temperature which is at or below the temperature used for shrinking and stretching the shrinkable foil so that during both the steps of stretching and shrinking at a shrinkable temperature, the material of the carrier elements is melted in an amorphous fashion to allow movement of the tear-resistant fibers in a reinforcing layer which is attached to the heat-shrinkable foil to form a composite envelope.

2. In an envelope according to claim 1, wherein the tear-resistant fibers are composed of a high temperature-resistant material selected from a group consisting of glass, ceramic, amides, carbon material and combinations thereof.

3. In an envelope according to claim 1, wherein the carrier material is composed of a non-cross-linkable plastic material.

4. In an envelope according to claim 3, wherein said carrier material is composed of a non-cross-linkable polyamide.

5. In an envelope according to claim 1, wherein the melting point of the carrier material lies in a range of 60° C. to 160° C.

6. In an envelope according to claim 5, wherein the melting point of the carrier material is at 100° C.

7. In an envelope according to claim 5, wherein the melting point of the carrier material lies at least 10° lower than a stretched temperature of the foil.

8. In an envelope according to claim 1, wherein the carrier material is of an optimally low viscosity at the stretched temperature of the foil and lies below $10^6$ m Pas.

9. In an envelope according to claim 1, wherein the volume of the carrier material is larger than the volume of the tear-resistant fibers.

10. In an envelope according to claim 9, wherein the volume of the carrier material amounts to 10–100 times larger than the volume of the tear-resistant fibers.

11. In an envelope according to claim 10, wherein the volume of the carrier material lies in a range of 4–20 times the volume of the tear-resistant fibers.

12. In an envelope according to claim 1, wherein the carrier material is composed of a hot-sealable glue.

13. In an envelope according to claim 1, wherein the tear-resistant fibers are applied on each of the carrier elements in the form of a fabric tube.

14. In an envelope according to claim 1, wherein the tear-resistant fibers are at least partially stretchable.

15. In an envelope according to claim 1, wherein the carrier material includes a plurality of carrier elements with a tear-resistant fiber being arranged as a layer on the shrinkable foil.

16. In an envelope according to claim 1, wherein a shrinkable foil is composed of a cross-linkable polyethylene.

17. In an envelope according to claim 1, wherein the shrinkable foil is provided with sealing profiles along longitudinal edges to form a sleeve.

18. In an envelope according to claim 1, wherein a connection of the shrinkable foil and a reinforcing layer occurs by coextrusion.

19. In an envelope according to claim 1, wherein the connection of a shrinkable foil and a reinforcing layer is accomplished by lamination.

20. In an envelope according to claim 1, wherein the tear-resistant fibers are anchored in an edge region of the envelope.

21. In an envelope according to claim 1, wherein additional tear-resistant fibers are provided to extend perpendicular to the first-mentioned shrink direction.

22. In an envelope according to claim 21, wherein the first-mentioned tear-resistant fibers are provided with first carrier elements and the additional tear-resistant fibers are provided with additional carrier elements, said additional carrier elements forming a mat with the first carrier elements.

23. In an envelope according to claim 1, wherein the shrinkable foil extends past the edge of the foil along the shrinkable direction to form an overhang.

24. In an envelope according to claim 1, which includes an additional shrinkable foil disposed on a surface of the reinforcing layer opposite the first-mentioned shrinkable foil.

25. In an envelope according to claim 24, wherein each of the two shrinkable foils are interconnected by a mutual transgrid action through the reinforcing layer.

26. In an envelope according to claim 1, wherein an inside surface of the composite envelope is provided with a layer of hot-sealable glue.

27. In an envelope according to claim 1, wherein the carrier material was provided as a carrier element in the form of a plate or foil with the tear-resistant fibers being embedded therein.

28. In an envelope according to claim 27, wherein prior to the stretching operation, the tear-resistant fibers in the carrier elements are not arranged to extend in a straight fashion.

29. In an envelope according to claim 27, wherein the tear-resistant fibers are fashioned as short fiber pieces which do not extend over the full width of the composite envelope.

30. In an envelope according to claim 1, wherein the tear-resistant fibers in a non-stretched condition have excess length.

31. In an envelope according to claim 1, wherein the envelope is designed as a cable sleeve.

32. In an envelope according to claim 1, wherein more than one fiber is applied on each carrier element by winding in different directions to have at least one fiber crossing over the remaining fibers.

* * * * *